(12) United States Patent
Narayanan

(10) Patent No.: US 7,683,811 B2
(45) Date of Patent: Mar. 23, 2010

(54) STORAGE AND RETRIEVAL OF COMPRESSED DATA IN MIXED MODE

(76) Inventor: Sarukkai R. Narayanan, 3121 N. Harvey Pkwy., Oklahoma City, OK (US) 73118

( * ) Notice: Subject to any disclaimer, the term of this patent is extended or adjusted under 35 U.S.C. 154(b) by 100 days.

(21) Appl. No.: 12/121,354

(22) Filed: May 15, 2008

(65) Prior Publication Data

US 2008/0294668 A1 Nov. 27, 2008

Related U.S. Application Data

(60) Provisional application No. 60/931,153, filed on May 21, 2007.

(51) Int. Cl.
*H03M 7/30* (2006.01)
(52) U.S. Cl. .......................... 341/87; 341/51
(58) Field of Classification Search .................... 341/87
See application file for complete search history.

(56) References Cited

U.S. PATENT DOCUMENTS

| | | | |
|---|---|---|---|
| 3,145,367 A | 8/1964 | Crane | |
| 3,342,979 A | 9/1967 | Wright | |
| 3,462,548 A | 8/1969 | Rinder | |
| 3,528,295 A | 9/1970 | Johnson | |
| 3,835,453 A | 9/1974 | Narayanan | |
| 4,549,167 A | 10/1985 | Kato et al. | |
| 5,486,828 A | 1/1996 | Mikami | |
| 5,793,661 A | 8/1998 | Dulong et al. | |
| 6,360,300 B1 * | 3/2002 | Corcoran et al. | 711/139 |
| 6,559,980 B1 | 5/2003 | Joffe | |
| 6,912,646 B1 | 6/2005 | Khu | |
| 6,927,710 B2 | 8/2005 | Linzer et al. | |
| 7,058,783 B2 * | 6/2006 | Chandrasekaran et al. | 711/171 |
| 7,298,293 B2 | 11/2007 | Narayanan | |
| 7,453,378 B2 | 11/2008 | Narayanan | |
| 7,471,218 B2 * | 12/2008 | Kuhns | 341/60 |
| 2007/0279267 A1 | 12/2007 | Mukaide | |

* cited by examiner

*Primary Examiner*—Khai M Nguyen

(57) ABSTRACT

Methods of storing and retrieving compressed data and uncompressed data in a mixed mode are described. Generally, the method comprises the steps of compressing a fixed amount of input data within a sequence of frames to provide storage and retrieval in a sequential manner and random manner. The sequence of frames includes at least a first frame and a final frame. Each frame includes a first portion for storing uncompressed data and a second portion for storing compressed data. The uncompressed data is stored within a first portion of the first frame. The compressed data is stored within a second portion of the first frame.

19 Claims, 12 Drawing Sheets

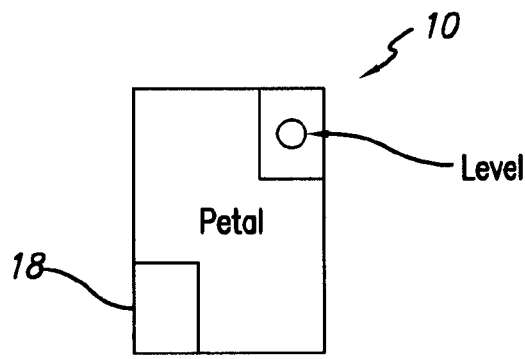
FIG. 1
FIG. 3
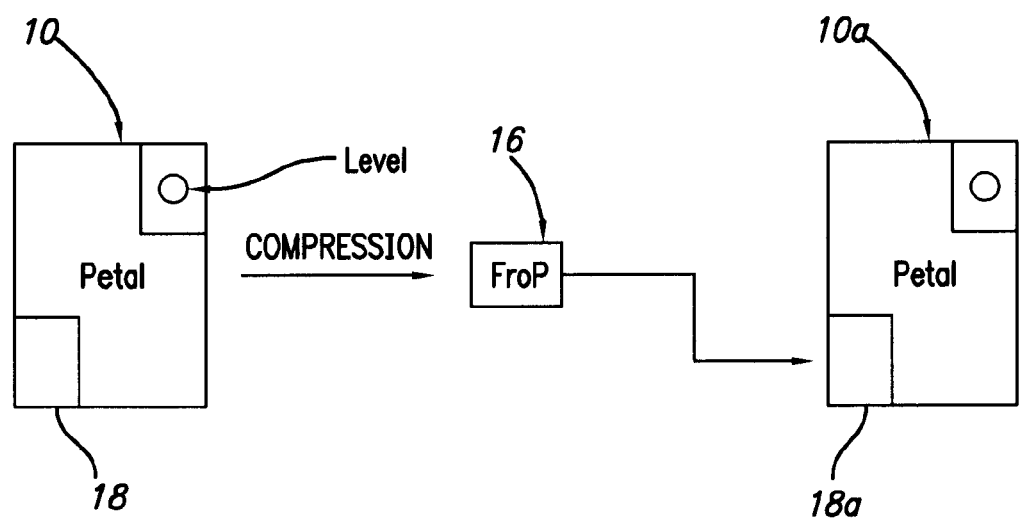

| LEVEL | CONE # | CELL WITHIN CONE # | SEED (PETAL ID) RANGE |
|---|---|---|---|
| 3 | 1 | 1 | 1-81 |
| 3 | 1 | 2 | 82-96 |
|   |   |   |   |
| 2 | 1 | 1 | 1-9 |
| 2 | 1 | 2 | 10-18 |
| 2 | 1 | 3 | 19-27 |
| 2 | 1 | 4 | 28-36 |
| 2 | 1 | 5 | 37-45 |
| 2 | 1 | 6 | 46-54 |
| 2 | 1 | 7 | 55-63 |
| 2 | 1 | 8 | 64-72 |
| 2 | 1 | 9 | 73-81 |
| 2 | 2 | 1 | 82-90 |
| 2 | 2 | 2 | 91-96 |
|   |   |   |   |
| 1 | 1 | 1 | 1-1 |
| 1 | 1 | 2 | 2-2 |
| 1 | 1 | 3 | 3-3 |
| 1 |   | : |   |
| 1 | 2 | 1 | 10-10 |
| 1 |   | 2 | 11-11 |
| 1 |   | : |   |
| 1 | 3 | 1 | 19-19 |
| 1 |   | 2 | 20-20 |
| 1 |   | : |   |

FROM FIG. 11-1

| 1 | 4 | 1 | 28-28 |
|---|---|---|-------|
| 1 |   | 2 | 29-29 |
| 1 |   | ⋮ |       |
| 1 | 5 | 1 | 37-37 |
| 1 |   | 2 | 38-38 |
| 1 |   | ⋮ |       |
| 1 | 6 | 1 | 46-46 |
| 1 |   | 2 | 47-47 |
| 1 |   | ⋮ |       |
| 1 | 7 | 1 | 55-55 |
| 1 |   | 2 | 56-56 |
| 1 |   | ⋮ |       |
| 1 | 8 | 1 | 64-64 |
| 1 |   | 2 | 65-65 |
| 1 |   | ⋮ |       |
| 1 | 9 | 1 | 72-72 |
| 1 |   | 2 | 73-73 |
| 1 | 10 | 1 | 82-82 |
| 1 |   | 2 | 83-83 |
| 1 |   | ⋮ |       |
| 1 | 11 | 1 | 91-91 |
| 1 |   | 2 | 92-92 |
| 1 |   | 3 | 93-93 |
| 1 |   | 4 | 94-94 |
| 1 |   | 5 | 95-95 |
| 1 |   | 6 | 96-96 |

*FIG. 11-2*

STORAGE AND RETRIEVAL OF COMPRESSED DATA IN MIXED MODE

CROSS-REFERENCE TO RELATED APPLICATIONS

This application claims priority to U.S. Provisional Application Ser. No. 60/931,153 filed May 21, 2007, the entire disclosure of which is hereby incorporated into this disclosure.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC AND AN INCORPORATION BY REFERENCE OF THE MATERIAL ON THE COMPACT DISC

Not applicable.

BACKGROUND

1. Field of the Invention

The present invention relates generally to the storage and retrieval of data in a mixed mode. More specifically, but not by way of limitation, the invention relates to the storage and retrieval of datasets having uncompressed and compressed data residing within the same frame or data space.

2. Brief Description of Related Art

It is well recognized within the art that there are several advantages in compressing vast amounts of data into small sets. Compressing data eases data storage, transmission, and retrieval applications. For example, compressing data aids in the reduction of consumption of expensive resources including storage space and/or transmission bandwidth.

There are many different encoding schemes for compressing data. For example, in one embodiment described in the Patent entitled "METHOD FOR ENCODING DATA," the encoding scheme uses a compression process wherein an input stream is manipulated, encoded, and summarized to form entities that represent the input stream in a different form within the compressed sets. See U.S. Pat. No. 7,298,293, filed on May 18, 2006, the entire contents of which are hereby incorporated by reference in its entirety. In the alternative, in U.S. Provisional Patent No. 61/016,022 entitled METHOD FOR ENCODING & DECODING DATA, and the U.S. Provisional Patent No. 61/038,527 entitled METHOD FOR ENCODING & DECODING DATA, the subsequent decompression of data is described. See U.S. Provisional Patent No. 61/016,022, filed on Dec. 21, 2007, and U.S. Provisional Patent No. 61/038,527, filed on Mar. 21, 2008, the entire contents of which are hereby incorporated by reference in their entirety.

These references, and other similar encoding and decoding schemes, deal with what may be termed as "extreme" compression and decompression of data. Extreme compression, and also general compression and decompression of data, are useful in the storage and retrieval of data in a mixed mode as will be described in further detail herein.

Original data may be considered data in an uncompressed state. When the original data is compressed, this may be thought of as compression occurring at the "lowest level." Data manipulation of the resulting compression dataset is at a "higher level" as will be described in further detail herein.

Retrieval of data, whether at a lower level or a higher level, is generally needed either on a sequential basis, or on a random basis. For example, a motion picture that digitizes frame by frame and stores the frames in a medium for retrieval and play back utilizes sequential access. Alternatively, data provided on an as needed basis, such as an employee name or business contact, utilizes random access. Thus, a storage and retrieval process that accounts for both sequential access and random access is also generally needed.

Throughout the discussion, terms are used that are commonly found in the Flora species such as trees, branches, leaves, blooms, buds, petals, cones, etc. Using these analogies, the inter relationships between the various data elements are described in a more intuitive manner.

BRIEF SUMMARY OF THE EMBODIMENTS

The present embodiments relate to an encoding scheme involving memory and/or storage of uncompressed data and compressed data in a mixed mode. In one embodiment, a fixed amount of input data is compressed within a sequence of frames using a forward freeze. The forward freeze allows for the storage and retrieval of data within a mixed mode. The mixed mode is a combination of an uncompressed dataset and a compressed dataset within a single or multiple frames. In general, frames are subdivided into two portions wherein one portion contains uncompressed data and a second portion contains the compressed data. A first frame is encoded and compressed to form a compressed dataset. The compressed dataset from the first frame is stored within the second portion of a second frame, which contains uncompressed data in its first portion. The second frame is encoded and compressed to form a second compressed dataset. The second compressed dataset is stored within the second portion of a third frame, which contains uncompressed data in its first portion. This process is repeated until the final frame is compressed. Compression of the final frame yields the final compressed dataset.

In another embodiment, a fixed amount of input data is compressed within a sequence of frames using a reverse freeze. In a reverse freeze, the final frame is encoded and compressed to form a first compressed dataset. The first compressed dataset from the final frame is stored within the second portion of a preceding frame, which contains uncompressed data in its first portion. The preceding frame is encoded and compressed to form a second compressed dataset. This process is repeated until the first frame is compressed. Compression of the first frame yields the final compressed dataset.

BRIEF DESCRIPTION OF THE SEVERAL VIEWS OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of the invention and are therefore not to be considered limiting of its scope, for the invention may admit to other equally effective embodiments.

FIG. 1 is a block diagram of one embodiment of a petal having a freezer for storing a compressed component.

FIG. 3 is a flow chart illustrating one embodiment of a method for compressing the petal of FIG. 1 to form a mixed frame.

FIG. 11 is one embodiment of a seed pod table for storing information within the cone leaf of FIG. 10.

DETAILED DESCRIPTION OF THE EMBODIMENTS

Figure 2:
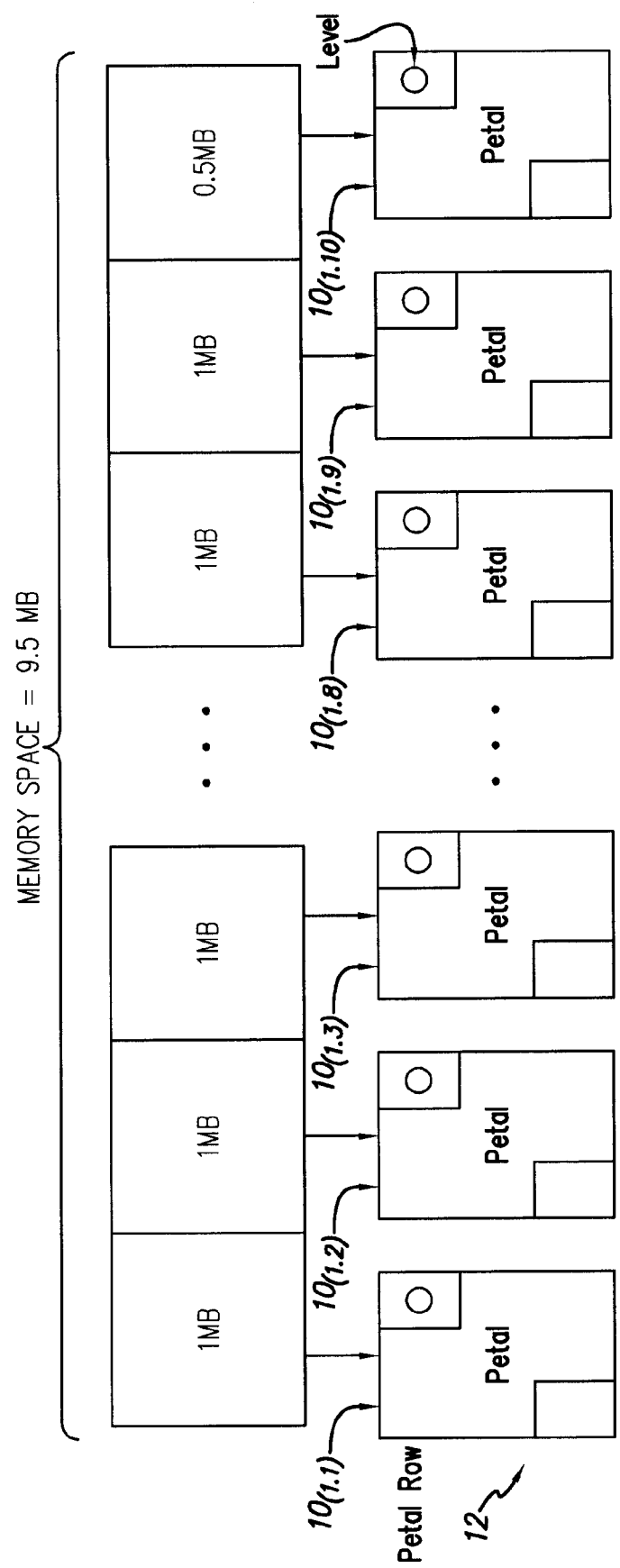
FIG. 2 is a block diagram of one embodiment of a petal row having a specific memory space for storing data.

Present embodiments of the invention are shown in the above-identified figures and described in detail below. In describing the embodiments, like or identical reference numerals are used to identify common or similar elements. The figures are not necessarily to scale and certain features in certain views of the figures may be shown exaggerated in scale or in schematic in the interest of clarity and conciseness.

Referring now to the figures, and in particular to FIGS. 1 and 2, shown therein and designated by reference numeral 10 is a petal having an arbitrary, but fixed amount of memory space. Throughout the specification, the petal 10 may also be referred to herein as a frame 10.

The size of the petal 10 may be related to the use and cost of the application, and as such, multiple petals 10 may be used. Additionally, in certain situations, it is advantageous to standardize the petal 10 size in order to facilitate exchange of information. For example, as illustrated in FIG. 2, if each petal 10 comprises one megabyte, and the application requires 9.5 megabytes, ten petals 10 may be needed in order to standardize the petal 10 size. In this situation, nine petals $10_{(1.1-1.9)}$ are able to hold nine megabytes of data and one petal $10_{(1.10)}$ holds 0.5 megabytes of data. Multiple sets of petals 10 are generally referred to as a petal row 12 or a frame row 12.

Petals 10 are identified by a two-part number known as the "Petal Tag" or "Frame Tag." The first number is the petal row number ($PR_N$) and the second number is the petal number ($P_N$) within the petal row 12, i.e. the sequence number of the petal 10. The Petal Tag is generally shown within round brackets as ($PR_N$, $P_N$). For example, the petal row 12 in FIG. 2 is a single row ($PR_N$=1). Thus the petal tags for the petal row 12 in FIG. 2 are: (1.1), (1.2), (1.3), (1.4), (1.5), (1.6), (1.7), (1.8), (1.9), and (1.10).

A sequence having 3 petal rows (not shown), a first row with 6 petals, the second row with 3 petals, and a third row with 3 petals, the following petal tags would be used:

For Row 1, the petal tags are: (1.1), (1.2), (1.3), (1.4), (1.5) and (1.6);

For Row 2, the petal tags are: (2.1), (2.2), and (2.3); and,

For Row 3, the petal tags are: (3.1), (3.2), and (3.3).

FIG. 3 illustrates a flow chart of one embodiment of a method for forming a mixed frame. The petal 10 represents information at the lowest level, that is, the petal represents information in the greatest expanded state (e.g. having uncompressed data). Data within the petal 10 is compressed through any suitable means to form the frozen petal 16. For example, compression of the data within the petal 10 may be through the super cooling process as described in U.S. Pat. No. 7,298,293, filed on May 18, 2006, entitled METHOD FOR ENCODING DATA, the entire contents of which are hereby incorporated by reference in its entirety. Although the reference discloses "extreme" compression, it will be apparent to one skilled in the art, the techniques described herein are not limited to "extreme" compression, but are relevant as long as compression results in a data set that is a percentage of the original size.

The formed frozen petal 16 may then be directed into the original petal 10 or a separate petal 10a. The frozen petal 16 is placed in a subset of the petal 10 and/or petal 10a referred to as a freezer 18. In the embodiment illustrated in FIG. 3, the petal 10 is compressed forming the frozen petal 16 and placed within the freezer 18a of the separate petal 10a. Petals 10a having both compressed data and uncompressed data are referred to as being in a mixed mode.

The freezer 18 may exist in any space within the petal 10. Preferably, in multiple sets of petals 10, each freezer 18 within each petal 10 is located in substantially the same location. For purposes of clarity and conciseness within the following description, each freezer 18 is illustrated within the figures in a fixed location within each petal 10.

The petal 10 generally contains two types of data: the compressed data and uncompressed data. As such, the petal 10 can exist in a mixed mode of compressed data and uncompressed data. As previously described, the compressed data is located within the freezer 18. As one skilled in the art will appreciate, compressed data is only generally useful once uncompressed.

The uncompressed data is located within the remaining space of the petal 10 external to the freezer 18. Examples of uncompressed data include text, sound, video, and other similar data. For example, the uncompressed data may contain sound data useful in electronic applications.

In general, access to data is primarily needed on either a sequential basis or random basis. Thus, the storage and retrieval process for a mixed mode must provide for both sequential access and random access in order to access the uncompressed data. In sequential access, there are primarily two techniques: forward freezing (also referred to as forward compression) and reverse freezing (also referred to as reverse compression).

1. Sequential Access—Forward Freeze

Forward freezing provides access to data on a sequential basis. Sequential access is useful in many applications such as the retrieval during motion picture storage and use. For example, a motion picture that digitizes each movie frame by frame and stores the movie frames in a medium for retrieval and play back, generally uses sequential access in retrieval.

The forward freezing process as described herein allows for sequential access by retrieving the data in reverse order of its original ordering.

Figure 4:
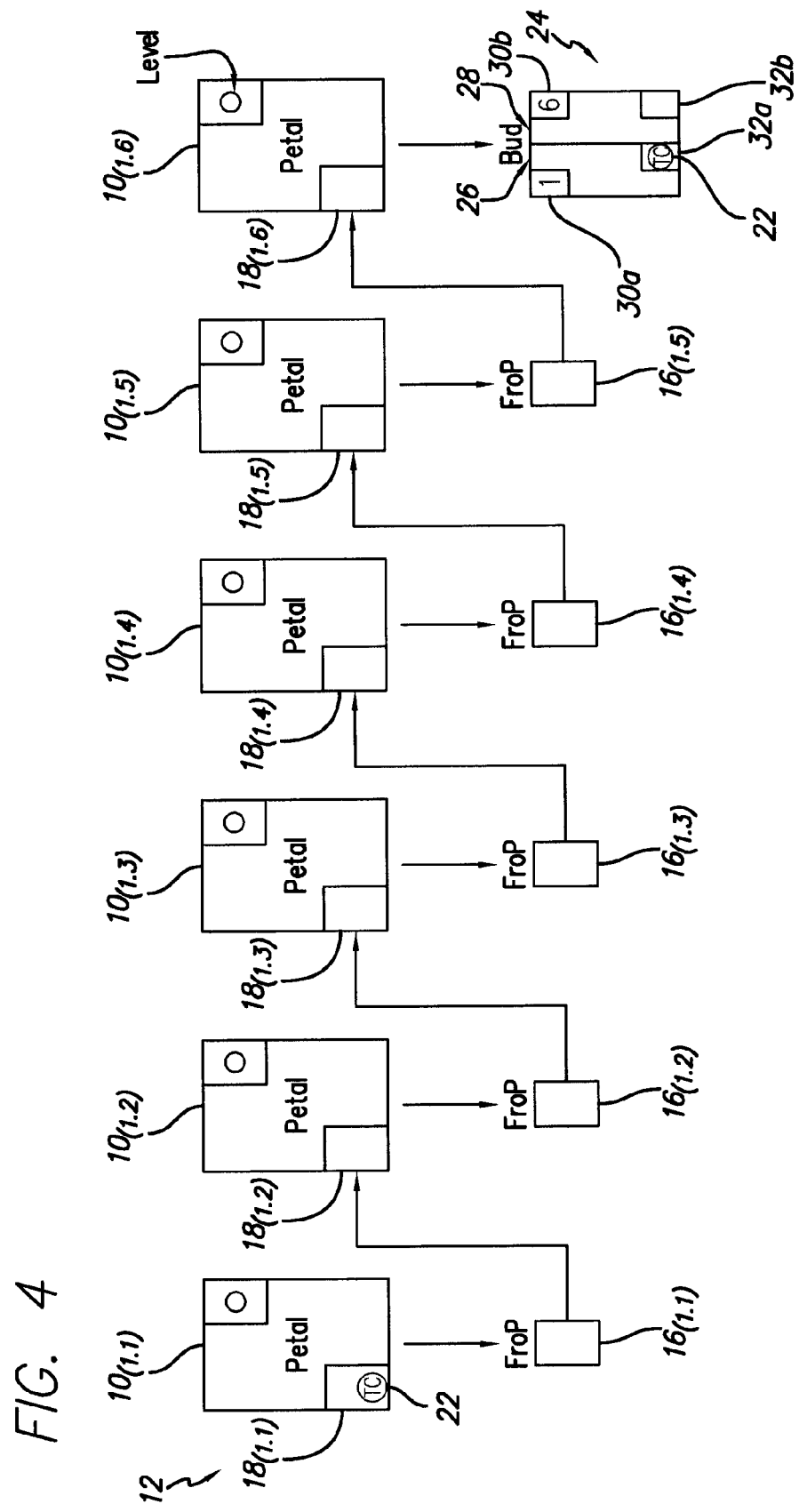
FIG. 4 is a flow chart illustrating one embodiment of a method for forward freezing a petal row to provide for the storage and retrieval of sequential information.

FIG. 4 is a block diagram illustrating one embodiment of a method for forward freezing. Generally, each of the petals 10 initially contains uncompressed data in a first portion designated for uncompressed data. Data is compressed within each petal 10 using an encoding scheme to form the frozen petal 16. In a preferred embodiment, the petals 10 are compressed using the super cooling process as described in the Patent entitled "METHOD FOR ENCODING DATA." See U.S. Pat. No. 7,298,293, filed on May 18, 2006, the entire contents of which are hereby incorporated by reference in its entirety. It should be noted that any other compression method known in the art may also be used to compress the data. In the super freezing process, an input stream of data is manipulated, encoded, and summarized to form entities that represent the input stream in a different form within the compressed sets. Super freezing allows for the unlimited compression of data. Compressing forms the frozen petal 16, which is inserted into the freezer 18 of a subsequent petal 10.

FIG. 4 illustrates forward freezing using six petals 10. The six petals 10 are within one petal row 12. Thus, the petal tags for each petal 10 are (1.1), (1.2), (1.3), (1.4), (1.5), and (1.6). It should be noted that any number of petals 10 within the petal row 12 may be used without deviating from the methods of forward freezing as described herein.

The first petal $10_{(1.1)}$ includes a termination code 22 within the freezer $18_{(1.1)}$. The termination code 22 provides a mechanism to signify a termination point during the decompression process. Initially, petal $10_{(1.1)}$ is compressed, and the resulting frozen petal $16_{(1.1)}$ is inserted into the freezer $18_{(1.2)}$ of the petal $10_{(1.2)}$. Petal $10_{(1.2)}$ is then compressed, and the resulting frozen petal $16_{(1.2)}$ is inserted into the freezer $18_{(1.3)}$ of petal $10_{(1.3)}$. This process continues through petal $10_{(1.6)}$ resulting in the freezer $18_{(1.6)}$ of the final petal $10_{(1.6)}$ holding all of the frozen petals $16_{(1.1)-(1.5)}$ in addition to uncompressed data external to the freezer $18_{(1.6)}$. Compression of the final petal $10_{(1.6)}$ results in the formation of a bud $24_{[1]}$, also referred to herein as a final compressed dataset.

Buds 24 are generally the same as a frozen petal 16. The distinction between buds 24 and frozen petals 16 is that a frozen petal 16 contains the compressed information of single petals 10, a bud 24 contains compressed information of a row of petals 12. In order to distinguish the additional information carried by the bud 24, the bud 24 is shown as a box with line drawn in the middle. For example, as illustrated in FIG. 4, a first half 26 of the bud $24_{[1]}$ represents the first petal $10_{(1.1)}$ and a second half 28 of the bud 24 represents the final petal $10_{(1.6)}$. In the first half 26 of the bud $24_{[1]}$, the first petal $10_{(1.1)}$ is numerically represented within a first box 30a and the content of the freezer $18_{(1.1)}$ is illustrated within a second box 32a. Similarly, in the second half 28 of the bud $24_{[1]}$, the final petal $10_{(1.6)}$ is numerically represented within a first box 30b and a second box 32b is blank.

Bud tags identify the path by which the bud $24_{[1]}$ is derived. The bud tag indicates the petal 10 and petal row 12 to which the bud 24 is attached to ($P_A$ and $PR_A$ respectively), and also includes the petal row from which it was formed ($P_F$). Bud tags are odd number of digits enclosed within square bracket represented as: $[P_A. PR_A. P_F]$. If the bud 24 does not attach to a separate petal row 12, the bud tag is represented solely as $[P_F]$ For example, the bud $24_{[1]}$ in FIG. 4 is derived through a single petal row 12 and is not attached to a separate petal row. The bud tag, [1], thus indicates a single petal row was used in deriving the bud 24. Bud tags become extremely useful in describing buds 24 derived and attaching to multiple petal rows 12, as will be discussed in further detail herein below.

Decompression extracts data within the bud $24_{[1]}$. Decompression may be through any decompression process known in the art, such as, for example, the decompression process described in U.S. Provisional Patent No. 61/016,022 entitled METHOD FOR ENCODING & DECODING DATA, and the U.S. Provisional Patent No. 61/038,527 entitled METHOD FOR ENCODING & DECODING DATA. See U.S. Provisional Patent No. 61/016,022, filed on Dec. 21, 2007, and U.S. Provisional Patent No. 61/038,527, filed on Mar. 21, 2008, the entire contents of which are hereby incorporated by reference in their entirety. Decompression of the bud $24_{[1]}$ begins with the final petal $10_{(1.6)}$. The freezer $18_{(1.6)}$ of the final petal $10_{(1.6)}$ holds the data in petals $10_{(1.1)-(1.5)}$ in a compressed form. Decompression of the data within each petal $10_{(1.1)-(1.5)}$ is in a sequential manner in the reverse order in which the petals $10_{(1.1)-(1.6)}$ were compressed. The contents of the freezer $18_{(1.6)}$ of the final petal $10_{(1.6)}$ is the same as the frozen petal $16_{(1.5)}$. Decompressing frozen petal $16_{(1.5)}$ yields petal $10_{(1.5)}$. This process is repeated until reaching the termination code 22 within the first petal $10_{(1.1)}$. The termination code 22 signals the end of the decompressing process.

2. Sequential Access—Reverse Freeze

Figure 5:
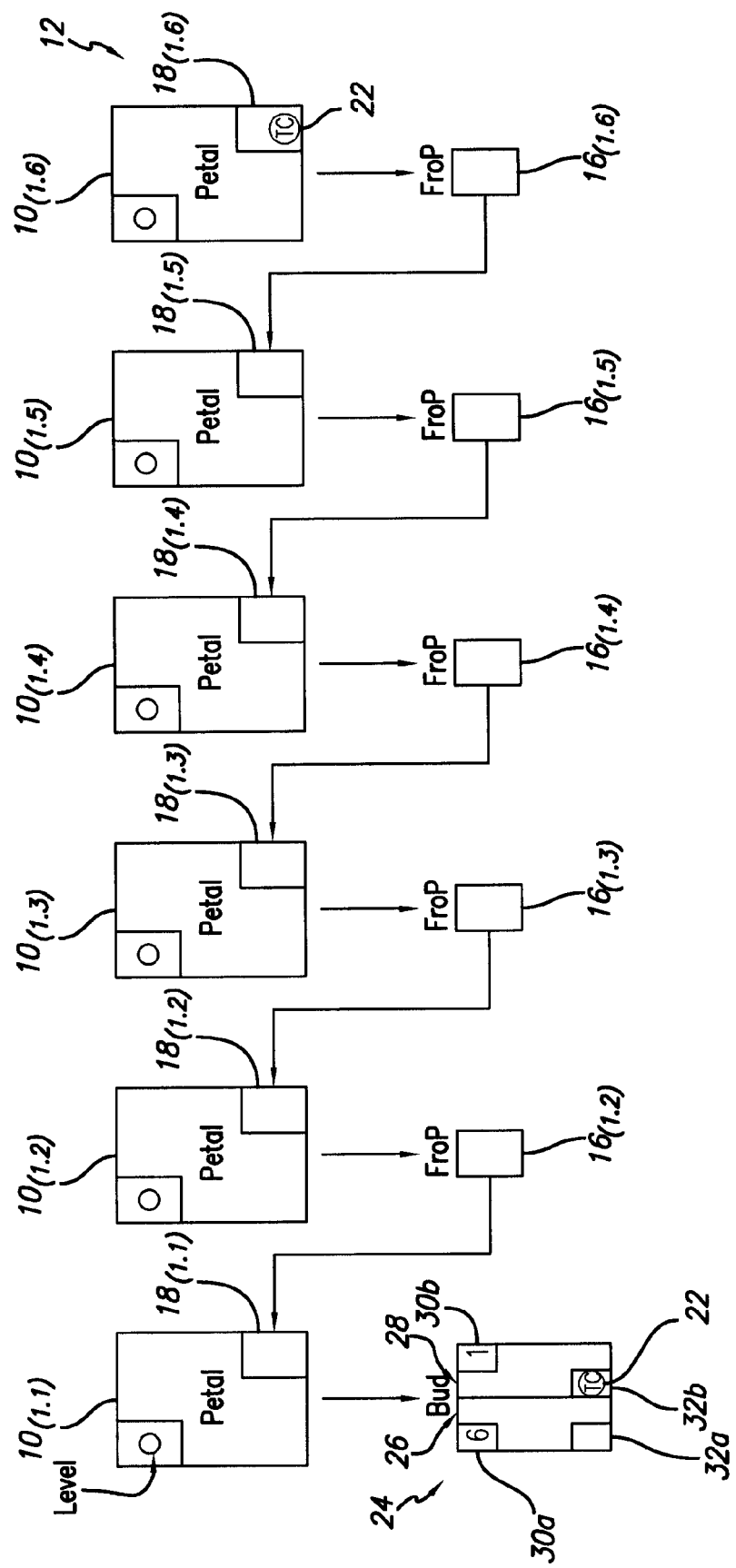
FIG. 5 is a flow chart illustrating one embodiment of a method for reverse freezing a petal row to provide for the storage and retrieval of sequential information.

Reverse freezing, similar to forward freezing, provides access to data on a sequential basis. FIG. 5 illustrates a block diagram of one embodiment of a method for reverse freezing using petals $10_{(1.1)-(1.6)}$. Although six petals 10 are illustrated in this embodiment, it should be noted that any number of petals 10 may be used without deviating from the scope of the reverse freeze process.

In the reverse freeze, the final petal $10_{(1.6)}$ includes the termination code 22 within the freezer $18_{(1.6)}$. The termination code 22 provides a mechanism to signify a termination point during decompression. Similar to the forward freeze, each petal 10 adds the frozen petal 16 of the previous petals 10. For example, petal $10_{(1.6)}$ is compressed, and the resulting frozen petal $16_{(1.6)}$ is inserted into the freezer $18_{(1.5)}$ of the petal $10_{(1.5)}$. Petal $10_{(1.5)}$ is then compressed, and the resulting frozen petal $16_{(1.5)}$ is inserted into the freezer $18_{(1.4)}$ of the petal $10_{(1.4)}$. This process continues through petal $10_{(1.1)}$. The petal $10_{(1.1)}$ contains uncompressed data in addition to the frozen petals $16_{(1.2)-(1.6)}$. Compression of the petal $10_{(1.1)}$ results in the formation of a bud $24_{[1]}$.

Decompression extracts data within the bud $24_{[1]}$. Decompression may be through any decompression process known in the art, such as, for example, the decompression process described in U.S. Provisional Patent No. 61/016,022 entitled METHOD FOR ENCODING & DECODING DATA, and the U.S. Provisional Patent No. 61/038,527 entitled METHOD FOR ENCODING & DECODING DATA. See U.S. Provisional Patent No. 61/016,022, filed on Dec. 21, 2007, and U.S. Provisional Patent No. 61/038,527, filed on Mar. 21, 2008, the entire contents of which are hereby incorporated by reference in their entirety. Decompression of the bud $24_{[1]}$ yields petal $10_{(1.1)}$. The freezer $18_{(1.1)}$ of the petal $10_{(1.1)}$ holds the data of petals $10_{(1.2)-(1.6)}$ in a compressed form. Decompression of the data within each petal $10_{(1.2)-(1.6)}$ is in a sequential manner in the reverse order in which the petals $10_{(1.2)-(1.6)}$ were compressed. The contents of the freezer $18_{(1.1)}$ of the petal $10_{(1.1)}$, is the same as the frozen petal $16_{(1.2)}$. Decompressing frozen petal $16_{(1.2)}$ yields the petal $10_{(1.2)}$. This process is repeated until reaching the termination code 22 within the petal $10_{(1.6)}$. The termination code 22 signals the end of the decompressing process.

In the embodiments of forward freezing and reverse freezing illustrated above, the petals $10_{(1.1)-(1.6)}$ have a sequential formation, e.g. petal $10_{(1.2)}$ follows petal $10_{(1.1)}$, petal $10_{(1.3)}$ follows petal $10_{(1.2)}$. For petals 10 in sequential formations, there is generally only one freezer 18 within each petal referred to as a primary freezer.

3. Sequential Access—Open Bloom

Compression and decompression of the data, either in forward freezing or reverse freezing, may include multiple petal rows 12 referred to as blooms. There are two main classifications of blooms: open blooms 34a and closed blooms 34b. In general, open blooms 34a and closed blooms 34b are well suited to describe life or biological forms. Blooms necessitate the use of multiple freezers 18 within each petal: one primary freezer 18a and one or more secondary freezers 18b. The primary freezer 18a within each petal 10 stores data associated that particular petal row 12. The secondary freezer 18b stores data associated with other petal rows 12.

Figure 6:
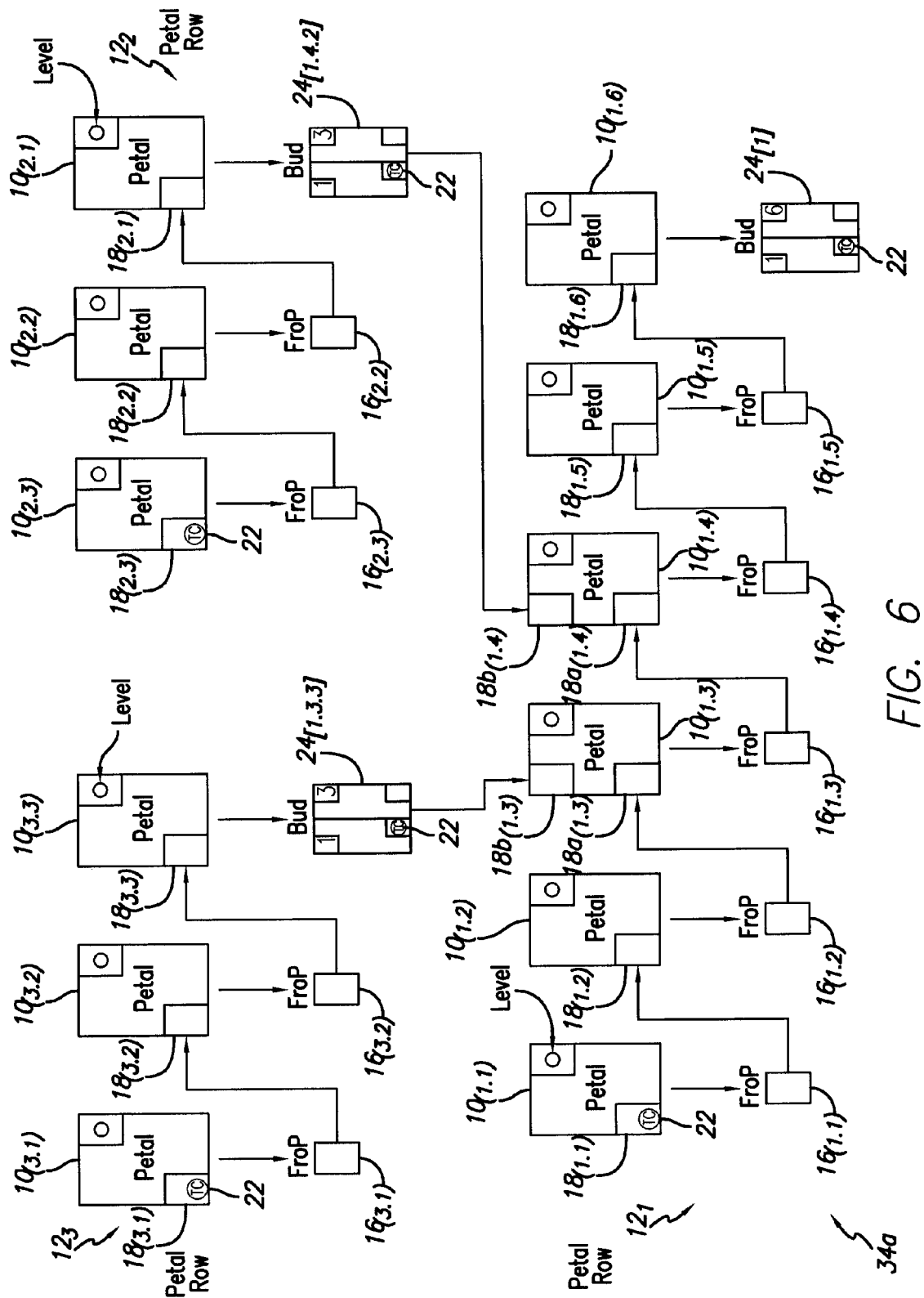
FIG. 6 is a flow chart illustrating one embodiment of a method for compressing an open bloom.

Generally, in the open bloom 34a, there are two types of petal rows 12: donor rows and receiver rows. In the open bloom 34a, frozen petals 16 and buds 24 of donor petal rows may only be stored in receiver petal rows. For example, FIG. 6 illustrates one embodiment of an open bloom 34a having three petal rows 12 comprised of one receiver row $12_1$ and two donor rows $12_2$ and $12_3$. The frozen petals 16 and buds 24 of donor petal rows $12_2$ and $12_3$ may only be stored in the receiver row $12_1$. It should be noted that although FIG. 6 illustrates two donor rows $12_2$ and $12_3$, and one receiver row $12_1$, any number of donor rows and/or receiver rows may be used.

The petal tags for the embodiment illustrated in FIG. 6 are shown below:

For petal row $12_1$ (receiver row), the petal tags are: (1.1), (1.2), (1.3), (1.4), (1.5) and (1.6);

For petal row $12_2$ (donor row), the petal tags are (2.1), (2.2), and (2.3); and, For petal row $12_3$ (donor row), the petal tags are (3.1), (3.2), and (3.3).

In the embodiment illustrated in FIG. 6, compression of donor petal row $12_3$ begins with petal $10_{(3.1)}$ and proceeds toward petal $10_{(3.3)}$. The bud $24_{[1.3.3]}$ formed by donor petal row $12_3$ is stored in the secondary freezer $18b_{(1.3)}$ of petal $10_{(1.3)}$.

As previously described, the bud tag indicates the path of the bud formation. Specifically, the bud tag indicates the petal row 12 and petal 10 to which the bud 24 is attached ($PR_A$ and $P_A$ respectively), and also includes the petal row from which it was formed ($P_F$). The bud tag is represented as: $[PR_A \cdot P_A \cdot P_F]$. The bud $24_{[1.3.3]}$ was formed in $12_3$ ($P_F$=3), and attaches to petal $10_{(1.3)}$ of petal row $12_1$ ($PR_A$=1 and $P_A$=3). As such, the bud tag for the bud formed in petal row $12_3$ is [1.3.3].

Compression of donor petal row $12_2$ begins at petal $10_{(2.3)}$ and proceeds to petal $10_{(2.1)}$ in the donor petal row $12_2$. The bud $24_{[1.4.2]}$ formed from the donor petal row $12_2$ ($P_F$=2) is stored in the secondary freezer $18b_{(1.4)}$ of petal $10_{(1.4)}$ in the receiver row $12_1$ ($P_A$=4 and $PR_A$=1). As such, the bud tag for the bud formed in petal row $12_2$ is [1.4.2].

The receiver row $12_1$ undergoes forward freezing starting at petal $10_{(1.1)}$ and ends at petal $10_{(1.6)}$. The bud $24_{[1]}$ formed by the receiver row $12_1$ is not attached to either donor petal row $12_2$ or $12_3$. As such, the bud tag for the bud formed in petal row $12_1$ is [1]. The bud$_{[1]}$ is the final compressed set. In the preferred embodiment, the final compressed set is a super frozen dataset.

In this example, there are three petal rows $12_1$, $12_2$, and $12_3$, and each petal row can be expanded in a similar manner as described above. Decompression extracts data within the buds $24_{[1]}$, $24_{[1.4.2]}$, and/or $24_{[1.3.3]}$. Decompression may be through any decompression process known in the art, such as, for example, the decompression process described in U.S. Provisional Patent No. 61/016,022 entitled METHOD FOR ENCODING & DECODING DATA, and the U.S. Provisional Patent No. 61/038,527 entitled METHOD FOR ENCODING & DECODING DATA. See U.S. Provisional Patent No. 61/016,022, filed on Dec. 21, 2007, and U.S. Provisional Patent No. 61/038,527, filed on Mar. 21, 2008, the entire contents of which are hereby incorporated by reference in their entirety. Decompression of the petal row $12_1$ yields petals $10_{(1.1)-(1.6)}$. The freezers $18b_{(1.4)}$ and $18b_{(1.3)}$ of the petals $10_{(1.4)}$ and $10_{(1.3)}$ hold the data of petals $10_{(2.3-2.1)}$ and petals $10_{(3.1-3.3)}$ respectively in a compressed form. Decompression of the data within each petal $10_{(2.3-2.1)}$ and $10_{(3.1-3.3)}$ is in a sequential manner in the reverse order in which the petals $10_{(2.3-2.1)}$ and $10_{(3.1-3.3)}$ were compressed. This process is repeated until reaching the termination code 22 within the each petal row 12. The termination code 22 signals the end of the decompressing process of the petal row 12.

4. Sequential Access—Closed Bloom

Similar to the open bloom 34a, in the closed bloom 34b there are two types of petal rows 12: donor rows and receiver rows. In the closed bloom 34b, however, frozen petals 16 and buds 24 of donor petal rows may be stored in either donor petal rows, receiver petal rows, and/or both.

Figure 7:
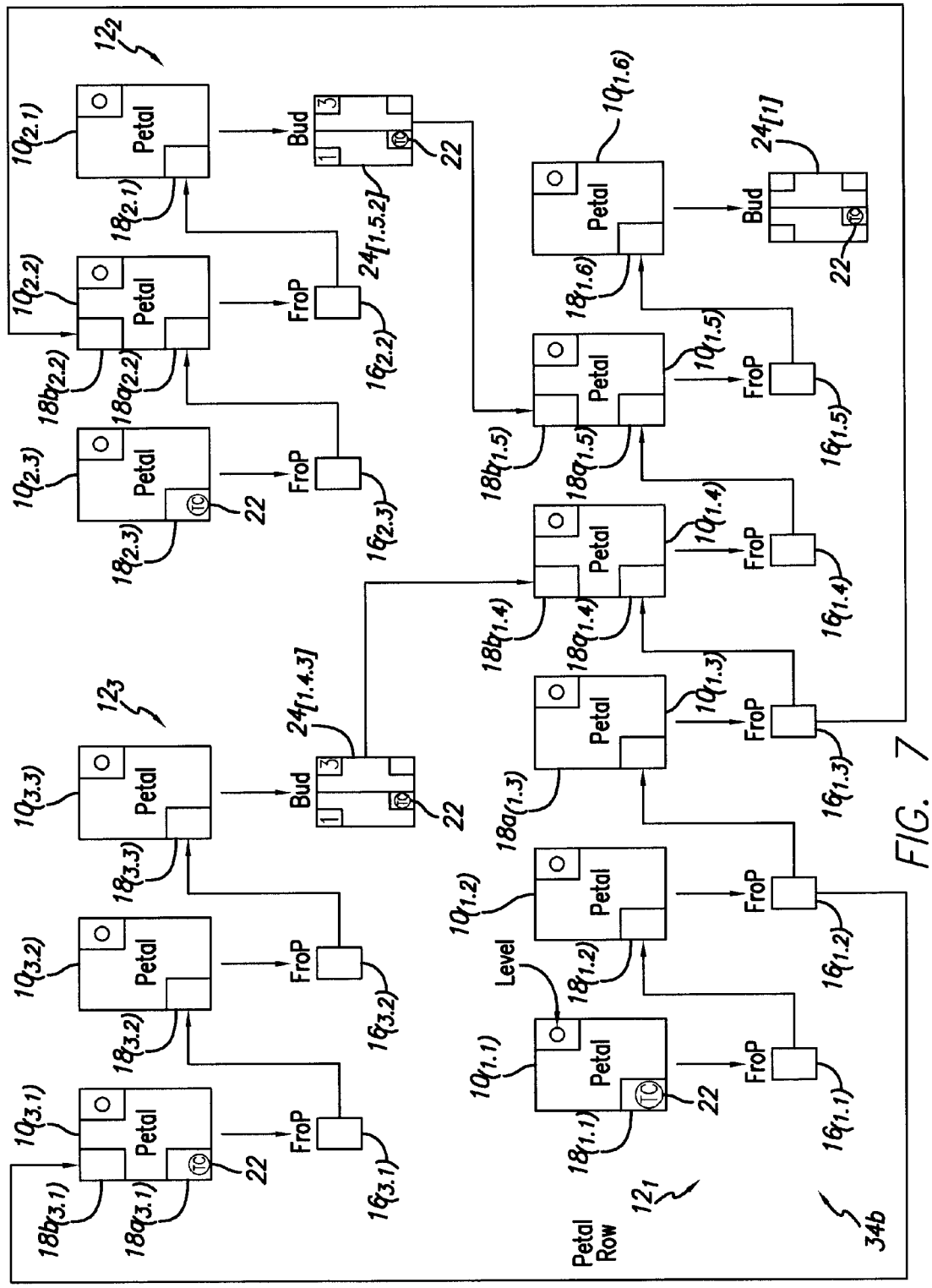
FIG. 7 is a flow chart illustrating one embodiment of a method for compressing a closed bloom.

FIG. 7 illustrates one embodiment of a closed bloom 34b having three petal rows $12_1$, $12_2$, and $12_3$ designated as either donor and/or receiver rows depending upon whether data from the rows $12_1$, $12_2$, and $12_3$ are provided to or received from the other rows $12_1$, $12_2$, and $12_3$. Similar to the open bloom 34a, in the closed bloom 34b the frozen petals 16 and buds 24 of donor petal rows $12_2$ and $12_3$ may be stored in the receiver row $12_1$. Additionally, in the closed bloom 34b, the frozen petals 16 and buds of the receiver row $12_1$ may also be stored within the donor petal rows $12_2$ and $12_3$. The donor petal rows $12_2$ and $12_3$ and/or receiver petal row $12_1$ may store their frozen petals 16 and/or buds 24 at any stage of compression. It should be noted that although FIG. 7 illustrates two donor rows $12_2$ and $12_3$, and one receiver row $12_1$, any number of donor rows and/or receiver rows may be used.

In the embodiment illustrated in FIG. 7, compression begins at the receiver petal row $12_1$ at petal $10_{(1.1)}$ and proceeds toward petal $10_{(1.2)}$. The frozen petal $16_{(1.2)}$ at this point is placed in the secondary freezer $18b_{(3.1)}$ of petal $10_{(3.1)}$ in donor row $12_3$, as well as in the primary freezer $18a_{(1.3)}$ of petal $10_{(1.3)}$. Petal $10_{(1.3)}$ of receiver petal row $12_1$ is compressed, and the frozen petal $16_{(1.3)}$ is placed in the secondary freezer $18b_{(2.2)}$ of petal $10_{(2.2)}$ of the donor row $12_2$, as well as in the primary freezer $18a_{(1.4)}$ of petal $10_{(1.4)}$ of the receiver row $12_1$.

Compression of the donor row $12_3$, begins at petal $10_{(3.1)}$ and proceeds towards petal $10_{(3.3)}$. The bud $24_{[1.4.3]}$, produced by the compression of donor row $12_3$ ($P_F$=3), is placed in the secondary freezer $18b_{(1.4)}$ of receiver row $12_1$ ($PR_A$=1, $P_A$=4). As such, the bud tag of donor row $12_3$ is [1.4.3].

In the next step, petal $10_{(1.4)}$ of the receiver row $12_1$ undergoes compression, and the frozen petal $16_{(1.4)}$ produced is placed in the primary freezer $18a_{(1.5)}$ of petal $10_{(1.5)}$. At this point, compression at petal $10_{(2.3)}$ of the donor row $12_2$ proceeds to $10_{(2.1)}$. The resulting bud $24_{[1.5.2]}$ formed from donor row $12_2$ ($P_F$=2) is stored in the secondary freezer $18b_{(1.5)}$ of the donor row $12_1$ ($PR_A$=1, $P_A$=5). As such, the bud tag of the donor row $12_2$ is [1.5.2].

Once the bud $24_{[1.5.2]}$ is formed, compression begins for frames $10_{(1.5)}$ and $10_{(1.6)}$ of the receiver row $12_1$ to form the bud $24_{[1]}$. The bud $24_{[1]}$ does not attach to either donor row $12_2$ or $12_3$. As such, the bud tag of the receiver row $12_1$ is [1]. The bud $24_{[1]}$ represents the super frozen set of the entire closed bloom 34b.

In this example, there are three petal rows $12_1$, $12_2$, and $12_3$, and each petal row can be expanded in a similar manner as described above. Decompression extracts data within the buds $24_{[1]}$, $24_{[1.5.2]}$, and/or $24_{[1.4.3]}$. Decompression may be through any decompression process known in the art, such as, for example, the decompression process described in U.S. Provisional Patent No. 61/016,022 entitled METHOD FOR ENCODING & DECODING DATA, and the U.S. Provisional Patent No. 61/038,527 entitled METHOD FOR ENCODING & DECODING DATA. See U.S. Provisional Patent No. 61/016,022, filed on Dec. 21, 2007, and U.S. Provisional Patent No. 61/038,527, filed on Mar. 21, 2008, the entire contents of which are hereby incorporated by reference in their entirety. Decompression of the petal row $12_1$ yields petals $10_{(1.1)-(1.6)}$. The freezers $18b_{(1.4)}$ and $18b_{(1.5)}$ of the petals $10_{(1.4)}$ and $10_{(1.5)}$ hold the data of petals $10_{(2.3-2.1)}$ and petals $10_{(3.1-3.3)}$ respectively in a compressed form. Decompression of the data within each petal $10_{(2.3-2.1)}$ and $10_{(3.1-3.3)}$ is in a sequential manner in the reverse order in which the petals $10_{(2.3-2.1)}$ and $10_{(3.1-3.3)}$ were compressed. This process is repeated until reaching the termination code 22 within each petal row 12. The termination code 22 signals the end of the decompressing process of the petal row 12.

5. Auxiliary Petals

Generally, each petal 10 contains information about a single entity. For example, a single entity could be an individual. The information on the particular individual may be in photographic form having multiple viewing angles, fingerprints, mug shots, address, and or similar types of information. This information may be stored within a single petal 10. If information on the specific entity cannot be stored within the single petal 10, an auxiliary petal may be used and the compressed information of the auxiliary petal placed within an auxiliary freezer within the single petal 10. In this situation, the single petal 10 is generally referred to as a host petal. For example, if information on the host petal cannot be stored entirely within the host petal, the auxiliary petal may be used. The auxiliary petal would contain the overflow of information from the host petal. The auxiliary petal is compressed to form an auxiliary frozen petal. The auxiliary frozen petal is placed in the auxiliary freezer of the host petal.

If all of the information for an entity can be contained in the uncompressed portion of a single petal 10, then the auxiliary freezer within the single petal 10 may be filled with special data. For example, the auxiliary freezer may be filled with all zeros indicating that there is no auxiliary petal for the petal 10.

The auxiliary petal may only contain one freezer, the primary freezer. If information on the entity overflows from the first auxiliary petal, a second auxiliary petal is created. The second auxiliary petal contains the information overflow from the first auxiliary petal. The second auxiliary petal is compressed to form a second auxiliary frozen petal. The second auxiliary frozen petal is placed in the primary freezer of the first auxiliary petal's freezer. The first auxiliary petal is then compressed to form the auxiliary frozen petal that is placed in the auxiliary freezer of the host petal.

This process is repeated until all of the data for a single entity is accommodated. The primary freezer of the last auxiliary freezer may be filled with special data indicating that there are no additional auxiliary petals in the chain.

6. Static Data Access

A leaf 40 provides the ability to store and retrieve large amounts of information that is relatively static. Leaves 40 are petals 10 that contain a significant portion of compressed datasets. As previously discussed, petals 10 contain information at "Level 0," that is petals 10 have information in useable form within the uncompressed portion. Leaves 40 are a higher level compared to petals 10. That is, leaves 40 are structured to store compressed datasets, and thus contain information at "Level 1." Similar to petals 10, a leaf 40 consists of an arbitrary, but fixed, amount of storage space.

Figure 8:
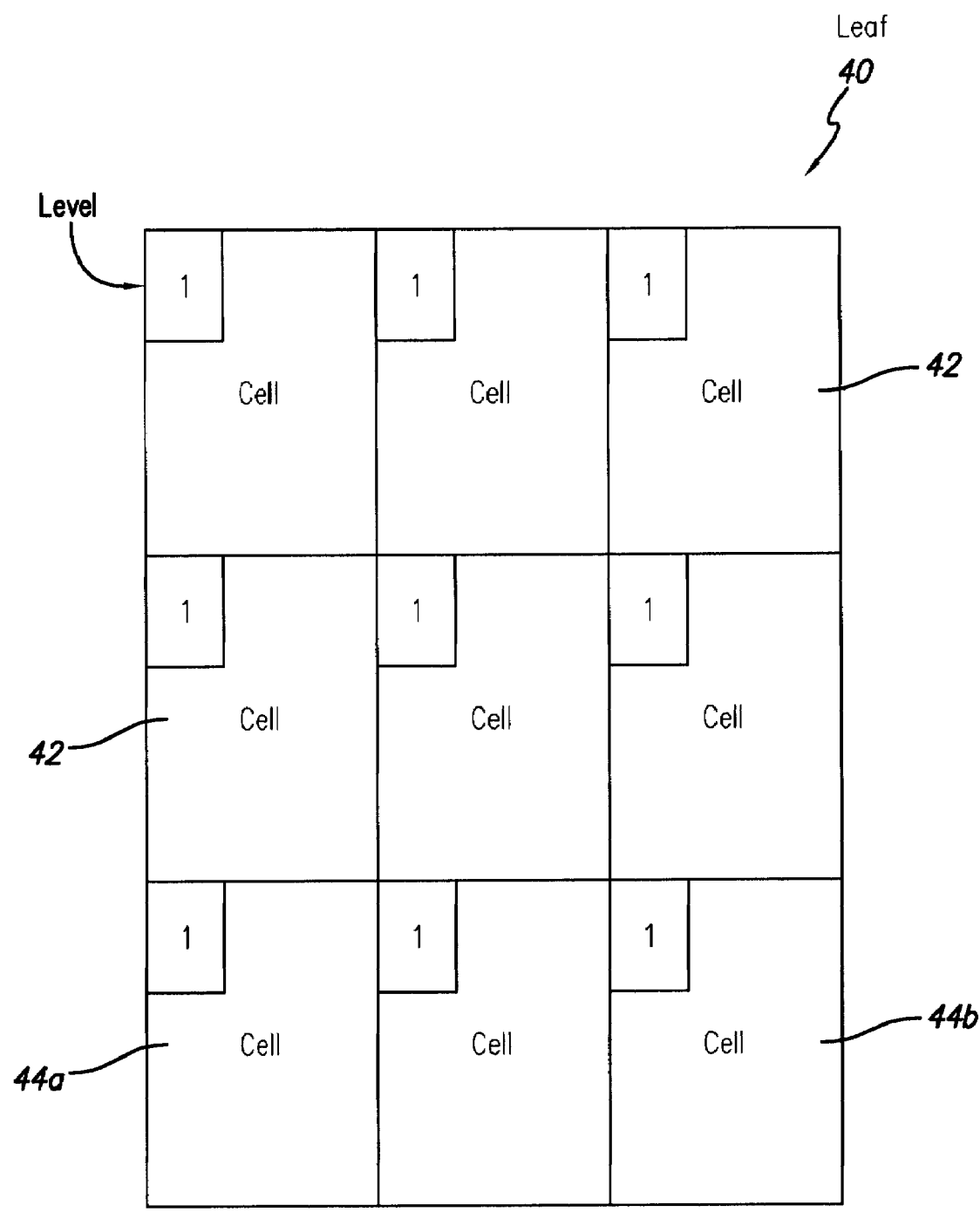
FIG. 8 is a block diagram illustrating a leaf having a specific memory space for storing data.

FIG. 8 illustrates one embodiment of a leaf 40. The leaf 40 is divided into cells 42. In this embodiment, each cell 42 is substantially similar in storage space to the related cells 42. Generally, cells 42 should be large enough to hold at least one compressed dataset, e.g. frozen petals 16 and/or buds 24.

Alternatively, the leaf 40 may be divided into cells 42 of varying sizes for the storage of compressed datasets, e.g. frozen petals 16 and/or buds 24. Leaves 40 having cells 42 of varying sizes will generally contain at least one cell 42 designated to store a table identifying each cell by its size, location, and/or other similar information. In an effort for clarity and conciseness, the following discussion relates to leaves 40 having cells 42 of similar sizes; however, as one skilled in the art will appreciate, the methods discussed herein may include leaves 40 having cells 42 of varying sizes.

As the size of the leaf 40 is generally fixed, only a certain number of compressed datasets (e.g. frozen petals 16 and/or buds 24) may be stored within the leaf 40. If additional storage is required, a second leaf 40 may be created and the additional compressed datasets may be stored within the second leaf. Additional leaves 40 may be added until all of the information to be stored is accommodated with a row of leaves. A row of leaves 40 that contain related information are referred to as a leaf cluster 43 (illustrated in FIG. 9).

Similar to petals 10, leaves 40 contain freezers known as leaf freezers 44. At least one cell 42 within the leaf 40 is designated as the leaf freezer 44. Additionally, similar to petals 10, each leaf 40 may contain a primary leaf freezer 44a and a secondary leaf freezer 44b. The leaf freezer 44 may be placed in any arbitrary location within the leaf 40. This location may vary between leaves 40. In the preferred embodiment, the location of the leaf freezer 44 within multiple leaves is at a fixed location. In an effort for clarity and conciseness, the leaf freezers 44 within the following discussion are described as positioned in a fixed location.

Figure 9:
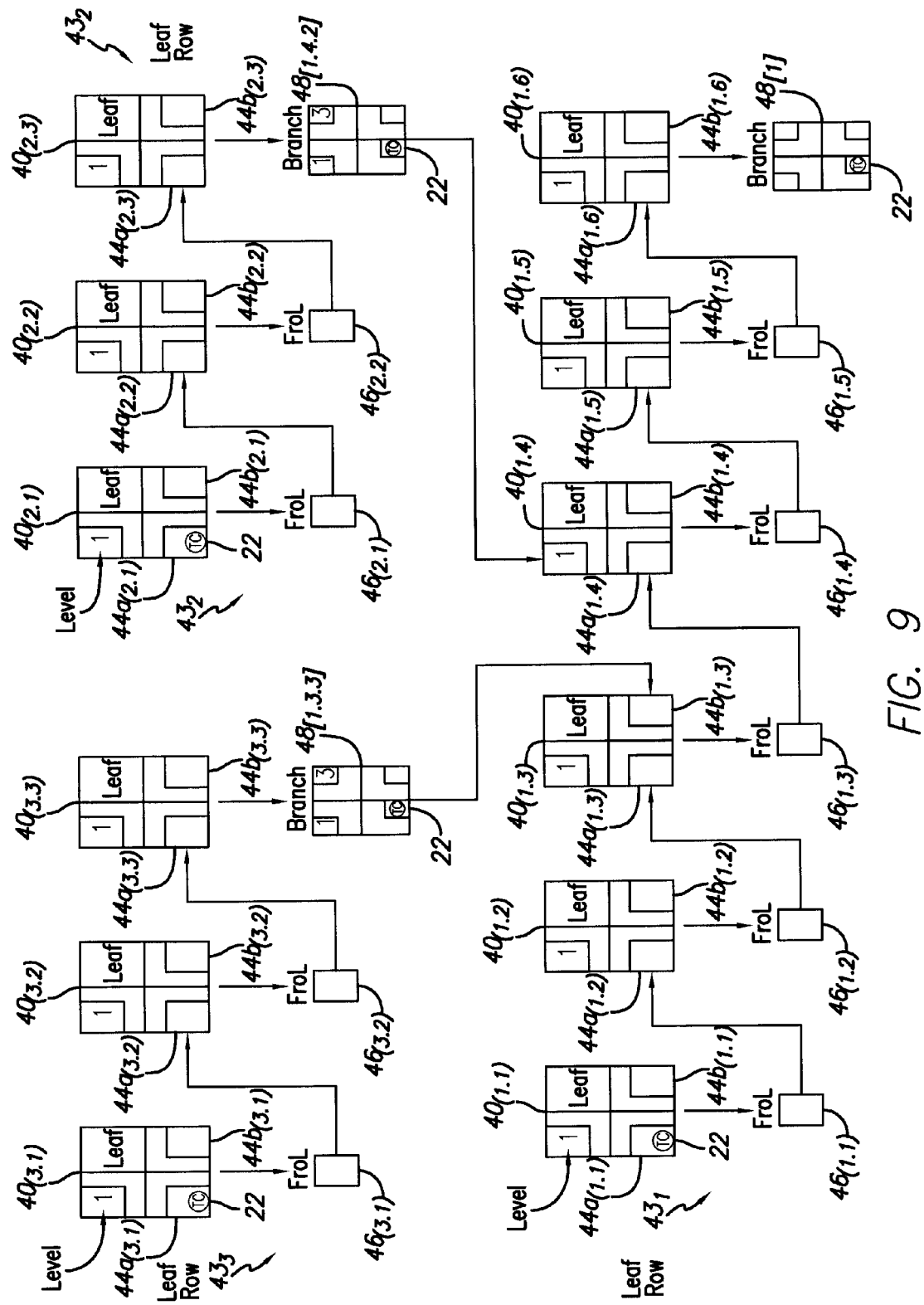
FIG. 9 is a flow chart illustrating one embodiment of a method for compressing multiple leaf clusters.

As illustrated in FIG. 9, representations and notations of leaves 40 are similar to petals 10, and representations and notations of branches 48 are similar to buds 24 with one exception: petals 10 and buds 24 are represented by a box having separating portions of the box, while leaves 40 and branches 48 are shown as quadrants.

Frozen leaves 46 are leaves 40 containing compressed information. When a leaf cluster 43 is repeatedly compressed (e.g. frozen), the final compressed dataset entity that results is referred to as a branch 48. The branch 48 is similar to the bud 24 discussed herein, however, as the branch 48 contains compressed datasets (e.g. frozen leaves 46 and/or buds 24) at Level 1, the branch 48 may be thought of as being at Level 2.

A tree stores a cluster of branches 44. The tree holds information at Level 3 and higher. Trees are not discussed further herein as it will be apparent to one skilled in the art that trees may be readily derived.

FIG. 9 illustrates one embodiment of the interrelation between three separate leaf clusters $43_1$, $43_2$, and $43_3$. The leaf cluster $43_1$ contains six leaves $40_{(1.1)-(1.6)}$, the leaf cluster $43_2$ contains three leaves $40_{(2.1)-(2.3)}$, and the leaf cluster $43_3$ contains three leaves $40_{(3.1)-(3.3)}$.

The branch $48_{[1.3.3]}$ of leaf cluster $43_3$ is stored in the secondary freezer $44b_{(1.3)}$ of leaf $40_{(1.3)}$ in leaf cluster $43_1$. Likewise, the branch $48_{[1.4.2]}$ is stored in the secondary freezer $44b_{(1.4)}$ of leaf $40_{(1.4)}$ in leaf cluster $43_1$. The entire leaf cluster $43_1$ is compressed into the branch $48_{[1]}$ shown in FIG. 9.

Retrieval of information from leaf clusters 43 follows the same pattern as the retrieval of information from petal rows 12. The retrieval of information from leaf clusters 43 is therefore not discussed further as it will be apparent to one skilled in the art how to derive the information based on the description of the retrieval of information from petal rows 12 provided herein.

7. Random Access—Volatile Information

Figure 10:
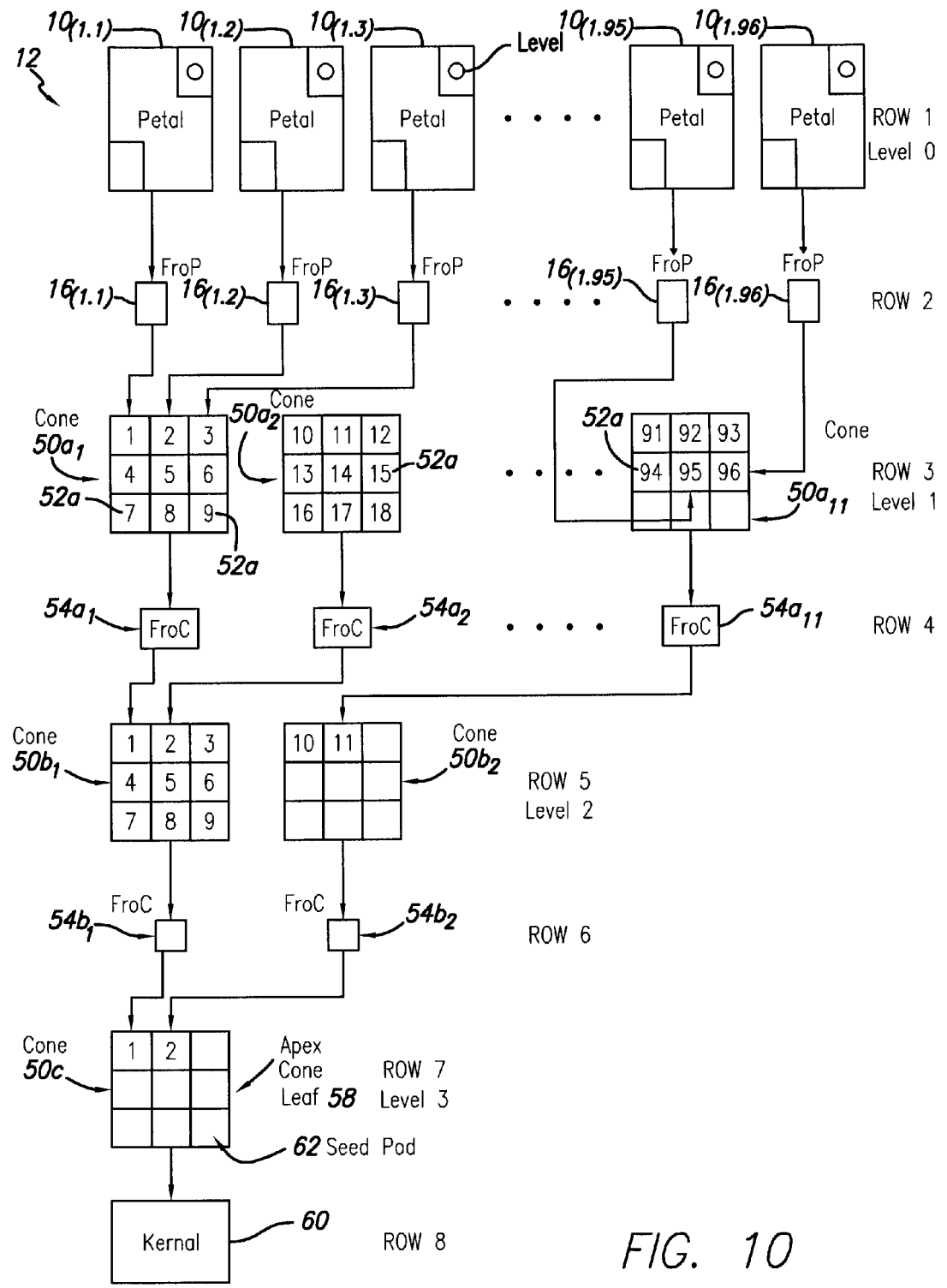
FIG. 10 is a flow chart illustrating one embodiment of a method for compressing a cone leaf to provide for the storage and retrieval of volatile information in a random manner.

Referring now to FIG. 10, in general, a cone leaf 50 provides a mechanism for the storage and retrieval of volatile information on a random basis. The cone leaf 50 follows the same scheme as leaves 40 with one exception. Generally, the cone leaf 50 does not contain freezers, and instead contains cone cells 52 providing for the storage of compressed information.

Generally, the cone leaf 50 is formed from a collection of leaves 40 at different levels. For example, if an entity has data that overflows the petal 10, then all of the auxiliary petals that contain data relating to the entity are compressed as previously described herein. The final auxiliary frozen petal is placed in the auxiliary freezer of the host petal. The host petal is then compressed to obtain the frozen petal 16. This frozen petal 16 is then placed in at least one cell 52 of the cone leaf 50. These steps are repeated until the petals for every entity are converted and stored within the cells 52 of the cone leaf 50. The cone leaf 50 is then compressed to produce a frozen cone leaf 54 (FroC). This results in at least one cone leaf 50 at Level 1 set. It should be noted that if the cone leaf 50 does not accommodate the frozen petals of all of the entities needed, then additional cone leaves 50 may be created.

Each of the cone leaves 50 within the Level 1 set is further compressed and placed within the cell 52 of another cone leaf. This results in at least one cone leaf 50 at a Level 2. Cone leaves 50 are provided in order to accommodate all of the frozen cones of Level 1. This process is repeated to form a single cone at the highest level referred to as an apex leaf 58. The apex leaf 58 is then frozen to provide a kernel 60.

The apex leaf 58 contains a special cell referred to as a seed pod 62. The seed pod 62 contains a table of storing references for identifying the location of each petal 10 stored within the apex leaf. For example, the table may contain entity IDs, level numbers, cone leaf identification, cell location, and/or other similar identifying factors.

FIG. 10 illustrates a flow chart of one embodiment of a method for producing a kernel 60 from cone leaves 50. Row 1 is the petal row 12 containing a series of petals $10_{(1.1)-(1.96)}$ from 1 through 96. The petals $10_{(1.1)-(1.96)}$ are considered to be at Level 0. Each petal $10_{(1.1)-(1.96)}$ is compressed to produce frozen petals $16_{(1.1)-(1.96)}$ as illustrated in row 2. The frozen petals $16_{(1.1)-(1.96)}$ are considered to be at Level 1. The frozen petals $16_{(1.1)-(1.96)}$ are stored in cells $52a$ of cone leaves $50a_{1-11}$ as illustrated in row 3. Each cone leaf $50a_{1-11}$ is segmented into nine cells. Thus, in the embodiment illustrated, eleven cone leaves $50a_{1-11}$ are needed in order to store the frozen petals $16_{(1.1)-(1.96)}$ of the 96 petals $10_{(1.1)-(1.96)}$.

The cone leaves $50a_{1-11}$ in row 3 are further compressed to form frozen cone $54a_{1-11}$ as illustrated in row 4. The frozen cones $54a_{1-11}$ in row 4 are considered to be at Level 2 and stored in the cells of cone leaves $50b_1$ and $50b_2$ illustrated in row 5. There are nine cells $52b$ in the cone leaves $50b_1$ and $50b_2$ that hold data. As such, only two cone leaves $50b_1$ and $50b_2$ are needed in order to store the frozen cones $54a_{1-11}$ of row 4.

The cone leaves $50b_1$ and $50b_2$ in row 5 are then frozen to produce frozen cones $54b_1$ and $54b_2$ in row 6. These frozen cones $54b_1$ and $54b_2$ are considered to be at Level 3. The frozen cones $54b_1$ and $54b_2$ are stored in the cone leaf $50c$ in row 7. The cone leaf $50c$ in row 7 is then frozen and stored in the kernel 60.

Through selectively decompressing the levels of information, random access to a specific entity is provided. For example, in order to access an entity stored in the petal 10 numbered 93, first the kernel 60 is decompressed (e.g. Super Heated) to get the cone leaf $50_c$. From this, the seed pod 62 is obtained. The seed pod 62 is then decompressed (e.g. Super Heated). Information in the table illustrated in FIG. 11 is stored within the seed pod 62. Generally, the seed pod 62 contains information on how to retrieve information stored in the cone leaves $50a$-$c$ of the entity of interest.

In this embodiment, the seed pod 62, reveals the information relating to the entity stored within the petals. Each of the rows 1-8 can be expanded as described above. For example, in order to retrieve the entity stored in petal $10_{(1.93)}$, first the kernel 60 is decompressed (e.g. super heated) to provide the apex cone leaf $50c$. The seed pod 62 within the apex cone leaf $50c$ is then decompressed (e.g. super heated). The seed pod 62 reveals information relating to the entity stored within petal $10_{(1.93)}$. Specifically, the seed pod 62 provides information that petal $10_{(1.93)}$ lies within the range 82-96 (as illustrated in FIG. 11). The table in FIG. 11 indicates the range 82-96 is located in cell 2 of the apex cone leaf $50c$ Cell 2 of the apex cone leaf $50c$ is decompressed (e.g. super heated) to obtain the cone leaf $50b_2$ at Level 2. The seed pod 62 (FIG. 11) indicates the petal $10_{(1.93)}$ lies within the range 91-96 in cell 11 of the cone leaf $50b_2$. The seed pod 62 (FIG. 11) also indicates that the petal $10_{(1.93)}$ lies within cell 93 of the cone leaf $50a_{11}$ at Level 1.

Cell 11 of the cone leaf $50b_2$ is decompressed (e.g. super heated) to obtain the cone leaf $50a_{11}$. Cell 93 of the cone leaf $50a_{11}$ is the same as the frozen petal $16_{(1.93)}$. Frozen petal $16_{(1.93)}$ is decompressed to obtain the uncompressed data of the entity stored in petal $10_{(1.93)}$.

The cone leaves $50a$-$c$, and associated kernel 60 as described, are well suited in applications without complex relationships between entities among the petals 10. Examples of such application include main memory management and communication applications. Additionally, the cone leaves $50a$-$c$ and kernel 60 structures may be used in entertainment applications wherein the majority of access is on a sequential basis, but also involves the need to fast forward and/or rewind to a specific frame on a random basis.

It should be noted that the concept of cone leaves 50 may be extended to the storing of buds 24 within the cells 52 of the cone leaves 50. The structure resulting from the storing of buds 24 within cone leaves 50 is referred to as a cascade. Cascades may be well suited for database applications wherein the storage, retrieval, and management of large amounts of data with complex structural relationships are needed. Generally, the buds 24 within the cells 52 of the cone leaves 50 allow complex structures to be stored and randomly accessed. As one skilled in the art will be readily able to carry out the extension of cascades using the methods described herein, the process is not described in detail.

Figure 12:
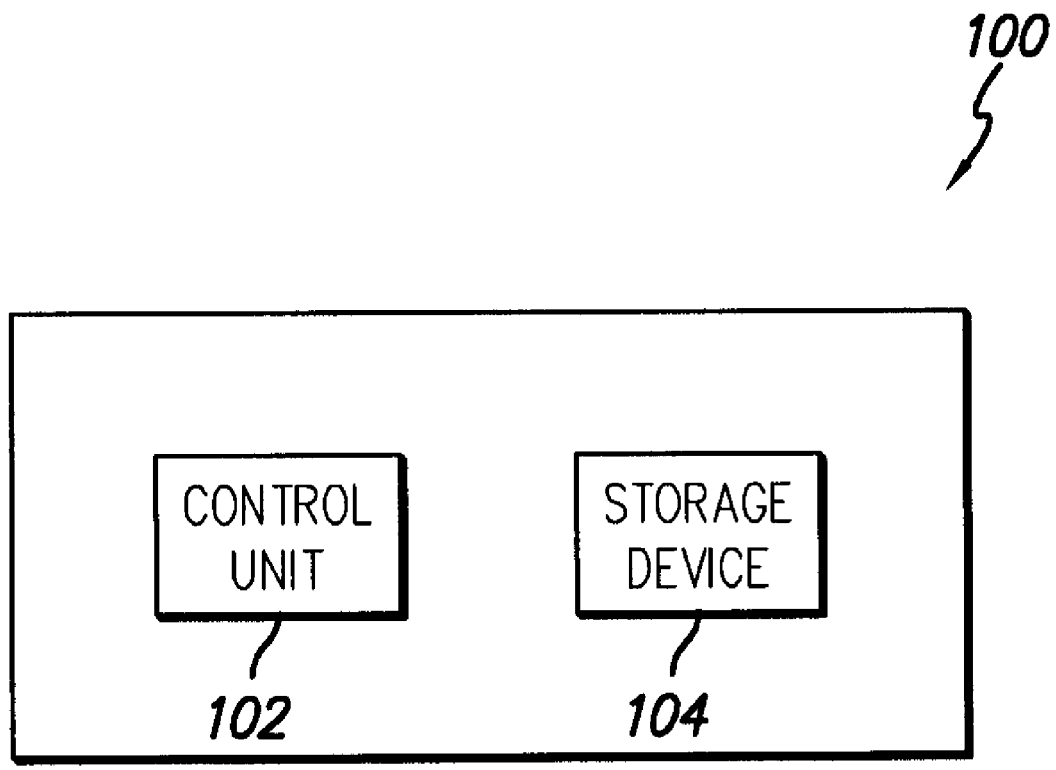
FIG. 12 is one embodiment of a system for storing and retrieving highly compressed data.

FIG. 12 illustrates one embodiment of a system 100 for storing and retrieving highly compressed data in mixed mode.

In this embodiment, the system 100 includes a control unit 102. The control unit 102 may be any computational device capable of executing the methods of storing and retrieving the highly compressed data as described herein. In one embodiment, the control unit 102 executes a process for compressing the data and provides the highly compressed data into stored components (e.g. petals, buds, and/or the like) contained in a storage device 104. The storage device 104 stores the program code and commands required for operation by the control unit 102 in performing the storage and retrieval of the uncompressed and compressed data. Alternatively, the program code may be incorporated into the control unit 102 itself.

From the above description, it is clear that the present invention is well adapted to carry out the objects and to attain the advantages mentioned herein, as well as those inherent in the invention. Although the foregoing invention has been described in some detail by way of illustration and example, it will be apparent to those skilled in the art that certain changes and modifications may be practiced without departing from the spirit and scope of the present invention, as described herein. Thus, the present invention is not intended to be limited to the embodiments shown but is to be accorded the widest scope consistent with the principles and features described herein.

What is claimed is:

1. A method of storing and retrieving a fixed amount compressed data and uncompressed data in a mixed mode, the method comprising:
    compressing a fixed amount of input data within a sequence of frames to provide storage and retrieval in a sequential manner, the sequence of frames having at least a first frame and a final frame, each frame having a first portion for storing uncompressed data and a second portion for storing compressed data;
    storing uncompressed data within a first portion of the first frame; and,
    storing compressed data within a second portion of the first frame.

2. The method of claim 1, further comprising the steps of:
    modifying, encoding, and compressing the first portion and the second portion of the first frame to form a first compressed dataset;
    storing the first compressed dataset in the second portion of a subsequent frame within the sequence of frames;
    modifying, encoding and compressing the subsequent frame to form a second compressed dataset; and,
    repeating the steps of encoding and compressing frames and storing compressed datasets within subsequent frames until the final frame is compressed to obtain a final compressed dataset formed in the forward direction.

3. The method of claim 2, further comprising the steps of:
    expanding the final compressed dataset to obtain the uncompressed data within the first portion of the final frame and compressed data within the second portion of the final frame;
    extracting the compressed data from within the second portion of the final frame;
    decoding and expanding the compressed data from the second portion of the final frame to obtain uncompressed data and compressed data of the preceding frame;
    repeating the steps of extracting compressed data and decoding and expanding the compressed data of the sequence of frames until uncompressed data and compressed data of the first frame is obtained, the first frame containing coded data in the second portion of the first frame; and,
    signaling, by the coded data, termination of the step of extracting data in the reverse direction.

4. The method of claim 1, further comprising the steps of:
    modifying, encoding and compressing the final frame to form a first compressed dataset, the final frame containing uncompressed data within the first portion and compressed data including a set of coded data within the second portion;
    storing the first compressed dataset in the second portion of a preceding frame within the sequence of frames;
    modifying, encoding and compressing the preceding frame to form a second compressed dataset; and,
    repeating the steps of encoding and compressing frames and storing compressed datasets within preceding frames until the first frame is compressed to obtain a final compressed dataset formed in the reverse direction.

5. The method of claim 4, further comprising the steps of:
    expanding the final compressed dataset to obtain the first frame, the first frame containing uncompressed data within the first portion and compressed data within the second portion;
    extracting the compressed data from within the second portion of the first frame;
    decoding and expanding the compressed data of the first frame to obtain the subsequent frame, the subsequent frame containing uncompressed and compressed data;
    repeating the steps of expanding and extracting until the final frame is obtained, the final frame containing coded data in the second portion of the first frame; and,
    signaling, by the coded data, termination of the step of extracting compressed data in the forward direction.

6. A method of storing and retrieving compressed data and uncompressed data in a mixed mode, the compressed data and uncompressed data being stored in at least one row of frames, the row of frames including at least a first frame and a final frame, the method comprising:
    subdividing each frame into:
        a first portion for storing uncompressed data of an entity;
        a second portion for storing compressed data of the entity; and,
        at least one secondary compressed portion for storing compressed data of a related entity, wherein the related entity is an external frame or an external frame row;
    compressing the row of frames to produce a final compressed dataset.

7. The method of claim 6, wherein the step of compressing the row of frames to produce the final compressed dataset includes compressing at least two rows of frames, wherein at least one of the two rows is a donor row and one of the two rows is a recipient row, the donor row capable of storing compressed datasets in the recipient row, the recipient row capable of being compressed to obtain an open compressed dataset.

8. The method of claim 7, further comprising the steps of:
    expanding the open compressed dataset to obtain the recipient row and the donor row;
    expanding the final compressed dataset of the recipient row to provide a first row of frames, the first row of frames having compressed data and uncompressed data in each frame;

expanding the final compressed dataset of the donor row to provide a second row of frames, the second row of frames having compressed data and uncompressed data in each frame;

decoding and expanding the compressed data of each frame to obtain the subsequent frame, the subsequent frame containing uncompressed and compressed data;

repeating the steps of decoding and expanding until the uncompressed data of each frame is obtained; and, signaling, by the coded data, termination of the step of decoding and extracting the compressed data with each frame.

9. The method of claim 6, wherein the step of compressing the row of frames to produce the final compressed dataset includes compressing at least two rows of frames, wherein the at least one of the two rows of frames is a donor row and at least one of the two rows of frames is a recipient row, the donor row capable of receiving and storing compressed datasets from the recipient row, the recipient row capable of receiving and storing compressed datasets from the donor row, the recipient row capable of being compressed to obtain a closed compressed dataset.

10. The method of claim 9, further comprising the steps of:
expanding the closed compressed dataset to obtain the recipient row and the donor row;
expanding the final compressed dataset of the recipient row to provide a first row of frames, the first row of frames having compressed data and uncompressed data in each frame;
expanding the final compressed dataset of the donor row to provide a second row of frames, the second row of frames having compressed data and uncompressed data in each frame;
decoding and expanding the compressed data of each frame to obtain the subsequent frame, the subsequent frame containing uncompressed and compressed data;
repeating the steps of decoding and expanding until the uncompressed data of each frame is obtained; and,
signaling, by the coded data, termination of the step of decoding and extracting the compressed data within each frame.

11. A method of storing and retrieving compressed data and uncompressed data in a mixed mode, the compressed data and uncompressed data being stored in at least one row of frames, the row of frames including at least a first frame and a final frame, the method comprising:
subdividing each frame into at least one subportion, each subportion capable of receiving and storing compressed data equal to or less than the size of the sub portion;
compressing the row of frames to produce a final compressed dataset.

12. The method of claim 11, further comprising the step of:
identifying each subportion containing compressed information; and,
recording within a table dataset the identification of each subportion for subsequent retrieval of the compressed information.

13. The method of claim 12, wherein the identification of each subportion includes row level, a range of frame identification numbers, and a range of entity identifications.

14. The method of claim 13, further comprising the steps of:
compressing the final compressed dataset;
providing the final compressed dataset to a subsequent row of frames;
compressing the subsequent row of frames to produce a subsequent final compressed dataset; and,
repeating the steps of compressing and providing compressed datasets until all of the fixed amount of data is compressed and provided in an apex dataset.

15. The method of claim 14, further comprising the step of:
compressing the table dataset; and,
storing the table dataset within a first subportion of the apex dataset, the first subportion of the apex dataset being separate from the subportion of the apex dataset storing the compressed data.

16. The method of claim 15, further comprising the step of compressing the apex dataset and storing the compressed apex dataset within a kernel.

17. A method of retrieving information from a kernel, the information being associated with a specific entity of interest, the method comprising the steps of:
expanding the kernel to obtain a final compressed dataset having a first compressed dataset and a table dataset, the step of expanding the kernel comprising the steps of:
expanding the first compressed dataset to obtain lower level compressed datasets; and,
expanding the table dataset to obtain entity identification of frame numbers within the lower level compressed dataset; and,
identifying a frame of interest within the table dataset.

18. The method of claim 17, further comprising the step of retrieving and expanding the lower level compressed datasets to obtain the frame of interest.

19. The method of claim 18, further comprising the step of identifying and expanding the frame of interest to obtain uncompressed data.

* * * * *